Jan. 27, 1948.　　B. S. WEAVER　　2,435,063
STAND-BY CONTROL SYSTEM
Filed Sept. 15, 1945

Inventor:
Burr S. Weaver,
by Claude A. Pett
His Attorney.

Patented Jan. 27, 1948

2,435,063

UNITED STATES PATENT OFFICE 2,435,063

STAND-BY CONTROL SYSTEM

Burr S. Weaver, Scotia, N. Y., assignor to General Electric Company, a corporation of New York Application September 15, 1945, Serial No. 616,633

6 Claims. (Cl. 320—32)

This invention relates to control systems; more particularly to stand-by control systems, and it has for an object the provision of a simple, reliable, improved and inexpensive control system of this character.

Many industrial applications require stand-by power as a protection against loss of power from the regular source. In certain applications transfer can be made by switching which imposes momentary discontinuity on the system. There are other applications which require the transfer from normal power to stand-by power with continuity of power maintained and with little or no change in the voltage during the transition.

One example of an application which requires continuity in the transition is the drive motor for the cutter of large propulsion gears. When the finishing cut is in progress it is necessary to maintain constant torque on the cutter. Switching transients may cause the loss of a gear costing several times the cost of the stand-by apparatus.

Accordingly a further object of this invention is the provision of a stand-by control system which maintains continuity of power to the load and reduces voltage surges to negligible values.

In carrying the invention into effect in one form thereof, a booster generator is included in the connection between the load and a stand-by battery. Three regulating devices are provided which are interconnected in such a manner as to control both the charging operation of the battery when the load is being supplied from the normal source and the discharging operation when the load is being supplied from the battery. One of the regulators controls the excitation of the booster generator to increase the voltage supplied to the battery as the charge on the battery increases from full discharge to a predetermined partial charge. A second regulator takes control at this predetermined partial charge and controls the booster generator to decrease the voltage supplied to the battery as the charge increases to full charge. At full charge this second regulator controls the booster generator to maintain a trickle charge to the battery while the load continues to be supplied from the normal power source. During stand-by operation the first two regulators are inactive, and the third regulator controls the booster so that the voltage supplied to the load from the stand-by battery is maintained substantially constant as the battery discharges.

Figure 1:
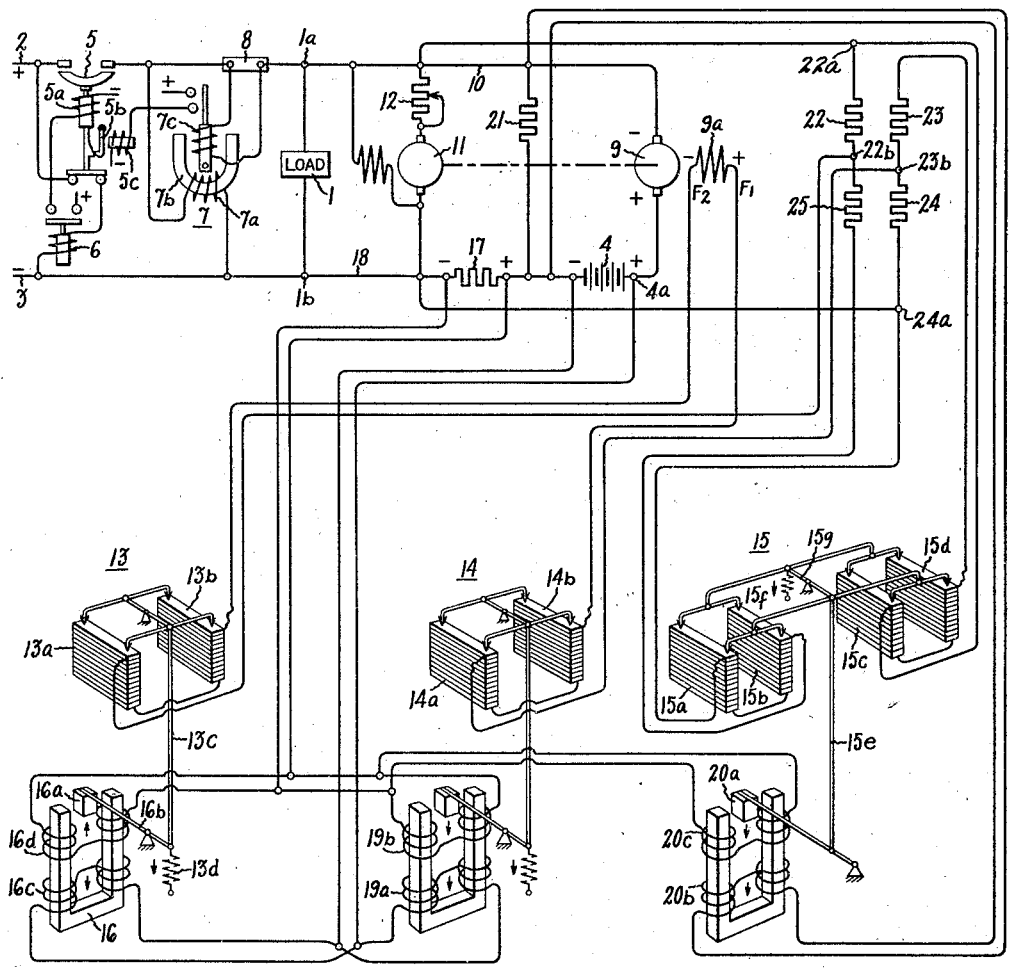
Figure 2:
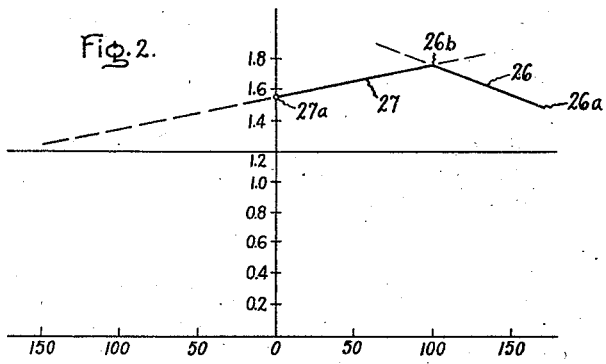

For a better and more complete understanding of the invention reference should now be had to the following specification and to the accompanying drawing of which Fig. 1 is a simple, diagrammatical sketch of an embodiment of the invention, and Fig. 2 is a chart of characteristic curves which are helpful in understanding the operation.

Referring now to the drawing, a load 1 is provided with connections to a normal source of power such as represented by the two supply lines 2 and 3 and to a stand-by source such as the battery 4. The normal source 2, 3 may be a commercial D.-C. source or a D.-C. shop supply. Its voltage may be any suitable value such as 120 volts. The battery 4 may be assumed to be a 100 cell battery having a voltage of approximately 1.5 volts per cell at no load when fully charged.

A circuit breaker 5 is included in the connections between the load 1 and the source. This circuit breaker has a closing coil 5a, a latch 5b for holding the breaker, and an opening coil 5c for unlatching and opening the breaker. The closing coil is controlled by means of a voltage relay 6 which is energized by the voltage of the source 2, 3.

A reverse current relay 7 controls the opening coil to open the circuit breaker in response to current flow from the battery and the load to the supply line 2, 3. This relay has a voltage coil 7a mounted on a U-shaped stationary core member 7b and a current coil 7c mounted on the movable contact carrying member 7d. The voltage coil 7a is energized by the voltage across the load and the current coil 7c is energized by the voltage drop across the resistor 8 in the connection between the load and the source.

The armature of a dynamoelectric machine 9 is connected in series in the connection 10 between the load terminal 1a and the positive battery terminal 4a. This dynamoelectric machine is driven at a speed which is preferably substantially constant by any suitable driving means such as the shunt wound D.-C. motor 11 which is connected to be supplied from the source 2, 3 when the circuit breaker is closed. During the charging operation, the dynamoelectric machine operates as a generator to boost the voltage supplied from the line to the battery. The polarity of terminal voltage during the charging operation is indicated in the drawing by polarity markings. During discharge when the battery voltage exceeds the normal line voltage it operates as a motor. If the battery voltage decreases below normal line voltage during discharge the machine 9 again operates as a generator driven by motor 11 to boost the voltage which is supplied to the load by the battery. A variable impedance device 12 is connected in the armature circuit of the motor 11 for bringing the set up to speed.

The field winding 9a of the booster generator is energized from the voltage across the load 1. Its excitation is varied during the charging and discharging operations by means of voltage regulating devices 13, 14 and 15.

The regulator 13 comprises two rheostatic elements 13a and 13b. Each of these rheostatic elements comprises a stack of resistance plates of which the resistance is varied by movement of the rod 13c to vary the pressure on the end of the stack nearest the rod. When the rod 13c is pulled downward the pressure on the stack is increased and its resistance is correspondingly decreased, and when the rod is moved upward the pressure on the stack is relieved and its resistance is correspondingly increased.

A spring 13d applies a downward pull to the rod and a magnetic voltage sensitive element acts to move the rod upward. This voltage sensitive element is illustrated as comprising a U-shaped magnet 16 and a suitably shaped armature 16a operating between the poles in the open end of the U. The armature is supported at one end of a light arm of which the opposite end is connected to the lower end of the actuating rod 13c. The arm 16b is pivoted between its ends to provide for pivotal movement in a vertical plane. The U-shaped member is provided with two windings 16c and 16d. The winding 16c is connected to be energized by the voltage across the battery 4 and is therefore referred to as the voltage coil. The winding 16c is energized by the voltage drop across the resistor 17 which is connected in series between the negative battery terminal and the lower terminal 1b of the load by means of a conductor 18. Since the voltage drop across resistor 17 is proportional to the charging or discharging current of the battery, the winding 16d is referred to as the current coil.

The current coil is so connected that when charging current flows through the voltage dropping resistor 17, the magnetomotive force of the current coil opposes that of the voltage coil and correspondingly weakens the downward pull on the armature produced by the voltage coil. In other words, the current coil aids the spring. During discharge the polarity of the voltage drop across resistor 17 is reversed and the current coil aids the voltage coil.

The structure of regulator 14 is in all respects identical with the structure of regulator 13. However, its current coil 19b is connected to aid the voltage coil 19a and oppose the spring during charging.

As shown, the regulator 15 has a pair of stacks 15a and 15b and a second pair of stacks 15c and 15d. Pressure is simultaneously applied to the front ends of all four stacks by the downward pull of the rod 15e. However, the spring 15f is connected by means of a lever 15g so as to move the rod upward and relieve pressure on the front ends of the stacks. The rod 15e is connected to an intermediate point on the pivoted lever which carries the armature 20a of the magnetic voltage sensitive element. Thus the voltage sensitive element applies pressure to the front end of the stacks to decrease the resistance. The voltage coil 20b is connected across the terminals of a resistor 21 so as to be responsive to the voltage of the load diminished or increased by the voltage drop across the resistor 17 depending upon whether the battery is being charged or discharged. The current coil is energized by the voltage drop across the resistor 17 and is so connected that it aids the voltage coil and opposes the spring during the charging operation.

Both pairs of stacks 15a, 15b, and 15c, 15d are connected in opposite arms of a bridge circuit of which the resistor 22 comprises a first arm, the stacks 15c and 15d and resistor 23 comprise the second arm, the resistor 24 comprises the third arm and the resistor 25 and stacks 15a and 15b comprise the fourth arm. The input bridge terminals 22a and 24a are connected across the load terminals 1a and 1b. The field winding 9a of the booster generator 9 is connected in series with stacks 13a, 13b and 14a, 14b across the output bridge terminals 22b and 23b which are of equal potential when the bridge is balanced. This circuit is traced from the bridge output terminal 22b through stacks 13a and 13b, field winding 9a, stacks 14b and 14a to the bridge terminal 23b.

The regulator 15 is initially adjusted for a voltage of 1.2 volts per cell with zero current in the current coil, i. e., when the voltage across the resistor 21 is 1.2 volts per cell the pull of the voltage sensitive element balances the pull of the spring.

With the foregoing understanding of the elements and their organization, the operation will readily be understood from the following description.

Assuming that the line voltage is equal to or greater than the normal value required at the load, the operating coil of the voltage relay 6 is energized and the relay picks up to complete an energizing circuit for the closing coil of the circuit breaker. In response to energization, the circuit breaker closes its main contacts to complete the supply connections from the supply source to the load, and opens its interlock contacts to interrupt the energizing circuit of the voltage relay, which thereupon drops out to interrupt the closing coil circuit of the circuit breaker. However, the circuit breaker is held closed by its latch.

Since the voltage of the supply source is equal to or greater than the normal value required by the load, a charging current is supplied to the battery of which the magnitude depends upon the existing state of charge. If the fully discharged condition is assumed, the charging current has a high value. During charging, the current coil 20c of regulator 15 aids the voltage coil and their combined pull overcomes the force of the spring and fully compresses the regulator stacks. This unbalances the bridge circuit thereby producing a voltage across the output terminals. The polarity of this voltage is positive at the terminal 23b and current flows in the field winding 9a of the booster generator in such a direction that the polarity of the voltage at the right-hand terminal F1 is positive and that at the left-hand terminal F2 is negative.

The current coil of regulator 13 aids the spring, and the combined action of the spring and current coil overcome the pull of the voltage coil and fully compress the stacks 13a and 13b. Thus, both regulators 13 and 15 are out of action with their stacks fully compressed and the field of the booster generator is at the maximum strength that can be produced by action of regulators 13 and 15. Thus the regulator 14 has control.

The polarity of the voltage of the booster generator is such that it adds to the line voltage and causes a large charging current to flow. If the battery is fully discharged as assumed, the charging current for the initial period of the charge can be very high, e. g. in excess of 150% of normal charging current, such as represented by the abscissa of the point 26a of the curve 26 in Fig. 2, in which ordinates represent voltage per cell of the battery and abscissae represent percentage of normal charging current. The spring of regulator 14 acts in a direction to compress the stacks thereby to increase the voltage of the booster generator to the value represented by the ordinate of point 26b.

With the charging current equal to the maximum permissible value for a fully discharged battery as represented by point 26a, if the voltage supplied to the battery should rise above the value represented by the ordinate of point 26a, the charging current would exceed the maximum permissible value. However, as the voltage and current tend to rise, the combined pulls of the current and voltage coils of regulator 14 overcome the pull of the spring and relieve the pressure on the stacks. This decreases the voltage of the booster generator and correspondingly decreases the voltage supplied to the battery sufficiently to reduce the charging current to the maximum permissible value for the fully discharged battery condition. A decrease in voltage below the value represented by 26a would of course result in a charging current less than the maximum permissible value. Any tendency of the voltage to decrease below the maximum permissible value is immediately counteracted by action of regulator 14 which is opposite to that described in the foregoing.

As the internal voltage of the battery rises in response to increasing charge, the charging current decreases. If the voltage supplied to the battery were not increased, the charging current would decrease to a value less than the maximum permissible value for this new state of partial charge. The decrease in charging current weakens the opposition of the current coil 19b to the spring thereby permitting the spring to increase the pressure on the stacks 14a and 14b. This results in increasing the voltage supplied to the battery sufficiently to maintain the charging current at the maximum permissible value for this state of partial charge. As long as the charging current exceeds the value 26b, the voltage and current coils acting together balance the spring at values of voltage and current represented by points along the curve 26. Thus, as the current decreases with increasing partial charge, the voltage applied to the battery is increased until a state of charge is reached such that any further increase in the voltage would result in a charging current in excess of the maximum permissible value. This point occurs when the decreasing charging current reaches 100% of the normal charging rate and is represented by the point 26b.

At this point, the pull of the current coils has been weakened to such an extent that the spring produces maximum compression of the stacks. In other words, the regulator 14 has reached the upper limit of its range so that it is unable to respond to further decreases in the charging current to increase the voltage of the booster generator.

Also, at the point 26b the opposition of the current coil 16d to the voltage coil 16c of regulator 13 is weakened by the decreased charging current to such an extent that the voltage coil overpowers the spring 13d and begins to relieve pressure on the stacks 13a and 13b thereby weakening the field of the booster generator and correspondingly decreasing the voltage supplied to the battery. This decrease of the voltage continues as the charging current decreases until the fully charged condition of the battery is closely approached as illustrated by curve 27. The fully charged condition is represented in Fig. 2 by the point 27a of the curve 27. At this point the opposition of the current coil to the voltage coil is reduced to such an extent that the voltage coil is enabled to reduce the pressure on the stacks and thereby reduce the voltage supplied to the battery to a value which is just sufficient to produce trickle charge. However, the regulator 13 is not at the lower limit of the range. Any tendency of the applied voltage to rise is resisted by the voltage coil which responds to effect a further reduction in the pressure on the stacks and a corresponding reduction in the voltage supplied to the battery. Similarly, in response to any tendency of the voltage to decrease below the value required to produce trickle charge, the regulator 13 strengthens the field of the booster generator to increase the voltage supplied to the battery.

If the normal supply source 2, 3 should fail, the battery will supply the load and in addition current will flow from the battery to the source 2, 3 in the reverse direction. This causes the reverse current relay to close its contacts to energize the opening coil of the line circuit breaker 5. In response to energization, the opening coil trips the latch and the circuit breaker opens.

Owing to the internal voltage drop in the battery the terminal voltage decreases in proportion to the discharge current which the battery supplies to the load. The regulator 14 is still out of action because the current in its current coil is reversed and the pull of the voltage coil is weakened by the decreased voltage at the battery terminals. Consequently the spring maintains both stacks fully compressed. Similarly, the pull of voltage coil 16c of regulator 13 is so weakened by the reduced voltage that the spring 13d overcomes the combined pull of both current and voltage coils and fully compresses both stacks to strengthen the excitation of the booster generator. Thus both regulators 13 and 14 are out of action with their stacks fully compressed in an endeavor to maintain the charging voltage which is higher than the normal voltage of the supply source 2, 3.

Since the voltage of the fully charged battery is greater than the normal line voltage of the supply source 2, 3 the excitation of the booster generator is controlled to reduce the voltage at the load. The reversal of current in the resistor 17 in the battery connections to the load reverses the current in the current coil 20c of regulator 15 thereby causing the current coil to aid the spring 15f. This enables the spring to overcome the pull of the voltage coil to relieve pressure on the stacks 15a, 15b, 15c and 15d to weaken the excitation of the booster sufficiently to reduce the voltage at the load to the normal value, i. e. 1.2 volts per cell.

As the discharge proceeds the battery voltage decreases with the result that the pull of the voltage coil is correspondingly decreased and the spring progressively relieves the pressure on the stacks to decrease the excitation of the booster generator. When the terminal voltage of the battery equals the normal line voltage, the pressure on the stacks is relieved to such an extent that the resistance of bridge resistor 22 is equal to the combined resistance of resistor 23 and stacks 15c and 15d, and the resistance of resistor 24 is equal to the resistance of resistor 25 and stacks 15a and 15b. Consequently the bridge is balanced and the excitation of the booster is reduced to zero.

Continuation of the discharge beyond this point further decreases the voltage and the spring effects a further decrease in the pressure on the stacks. This unbalances the bridge in the reverse direction and the field winding 9a of the booster generator is excited in the reverse direction. As a result, the voltage of the booster generator is now reversed, i. e. its polarity becomes the reverse of that illustrated in Fig. 1, so that the voltage of the booster adds to the voltage of the battery to maintain normal voltage of 1.2 volts per cell at the load terminals. As the discharge continues, the progressive decrease in voltage causes the regulator 15 gradually to strengthen the excitation of the booster so that normal voltage is maintained at the load even though the voltage of the battery falls below that value.

During discharge, the current coil 20c opposes the voltage coil and aids the spring. Consequently the pull of the spring is not balanced until the voltage increases to a higher value to compensate for the current coil's aid to the spring. Thus, the regulator is recalibrated to hold a voltage across the resistor 21 which increases with the current supplied by the battery to the load. This compounding action of the regulator maintains the voltage at the load substantially constant.

Upon restoration of the voltage of the supply source 2, 3 to its normal value the line circuit breaker is reclosed and the recharging operation is begun.

Although in accordance with the provisions of the patent statutes, this invention is described as embodied in concrete form and the principle thereof has been explained together with the best mode in which it is now contemplated applying that principle, it will be understood that the apparatus shown and described is merely illustrative, and that the invention is not limited thereto, since alterations and modifications will readily suggest themselves to persons skilled in the art without departing from the true spirit of the invention or from the scope of the annexed claims.

What I claim as new and desire to secure by Letters Patent of the United States is:

1. In a stand-by control system for a load device having connections to a supply source and to a stand-by battery, a booster generator having a field winding and having its armature connected in series in the load to battery connection, a first regulator having a coil responsive to the voltage of said battery and a coil responsive to said charging current and a variable resistance in the circuit of said field winding and controlled by said coils for controlling said generator to increase the voltage supplied to the battery as the charge on the battery increases from full discharge to a predetermined partial charge, a second regulator having a first coil responsive to the voltage of said battery and a second coil responsive to said charging current and a variable resistance in the circuit of said field winding and controlled by said first and second coils for controlling said generator to decrease the voltage supplied to the battery as the charge increases from said predetermined partial charge to full charge, and a third regulator having a voltage coil responsive to the voltage of said load device and a current coil responsive to the discharge current of the battery and a variable resistance in the circuit of said field winding and controlled by said voltage and current coils for controlling said generator to maintain the voltage at the load constant during discharge.

2. In a stand-by control system for a load device having connections to a source of supply and to a stand-by battery, a buck boost generator having a field winding and having its armature connected in series in the load to battery connection, a first regulator having a coil responsive to the voltage of said battery and a coil responsive to said charging current and a variable resistance in the circuit of said field winding and controlled by said coils for controlling said generator to supply a voltage that increases as the charging current decreases to increase the voltage supplied to the battery as the charge increases between full discharge and a predetermined partial charge, a second regulator having a first coil responsive to the voltage of said battery and a second coil responsive to said charging current and a variable resistance in the circuit of said field winding and controlled by said first and second coils for controlling said generator to supply a voltage that decreases as the charging current decreases to decrease the voltage supplied to the battery as the charge increases from said partial charge to full charge, and a third regulator having a voltage coil responsive to the voltage of said load device and a current coil responsive to the discharge current of the battery and a variable resistance in the circuit of said field winding and controlled by said voltage and current coils for controlling said generator to supply a voltage that decreases to zero and increases in reverse polarity as the discharge current increases to maintain the voltage supplied from the battery to the load constant as the discharge current increases.

3. In a stand-by control system for a load device having connections to a source of supply and to a stand-by battery, a booster generator having a field winding and having its armature connected in series in the load to battery connection, a first regulator having a coil responsive to the battery voltage, a coil responsive to the charging current and a variable resistance in the circuit of said field winding and controlled by said coils for controlling said generator to increase the voltage supplied to the battery as the charge on the battery increases from full discharge to a predetermined partial charge, a second regulator having a first coil responsive to the battery voltage, a second coil responsive to the charging current and a variable resistance in the circuit of said field winding and controlled by said first and second coils for controlling said generator to decrease the voltage supplied to the battery as the charge increases from said partial charge to full charge, and a third regulator having a voltage coil responsive to the load voltage, a current coil responsive to the discharge current and a variable resistance in the circuit of said field winding and controlled by said current and said voltage coils for decreasing the voltage of said generator to zero and increasing said generator voltage in reverse polarity to maintain the voltage at the load substantially constant as the charge on the battery decreases.

4. In a stand-by control system for a load device having connections to a normal source of supply and to a battery, a buck-boost generator having a field winding and having its armature connected in circuit between the load and the battery, a voltage drop device in the load to battery connection, a first regulator having an operating coil responsive to the battery voltage, another coil aiding said operating coil and responsive to the voltage drop across said voltage drop device proportional to the charging current and a variable resistance in the circuit of said field winding controlled by said coils for controlling said generator to cause a voltage to be supplied to the battery that increases as the charge of the battery increases from discharge to a partial charge of predetermined value, a second regulator having a first coil responsive to the battery voltage and a second coil opposing said first coil and responsive to the voltage drop across said voltage drop device proportional to the charging current and a variable resistance in the circuit of said field winding controlled by said first and second coils for controlling said generator to cause a voltage to be supplied to the battery that decreases as the charge of the battery increases from said partial charge to full charge, and a third regulator having a voltage coil responsive to the voltage across the load device, a current coil opposing said voltage coil and responsive to the voltage drop across said voltage drop device proportional to the discharge current and a variable resistance in the circuit of said field winding controlled by said voltage and current coils for controlling said generator to supply a voltage that decreases as the discharge current increases thereby to maintain the voltage supplied to the load substantially constant during discharge.

5. In a stand-by control system for a load device having connections to a supply source, a pair of conductors having terminals adapted to be connected to the load device and terminals adapted to be connected to a stand-by battery, a generator having its armature connected in series in one of said conductors and having a field winding, a voltage dropping resistor connected in series in one of said conductors, a first regulator having an operating coil responsive to the voltage across said battery terminals, a coil aiding said operating coil and responsive to the voltage across said resistor during charging and a variable resistance in the circuit of said field winding controlled by said coils for controlling said generator to increase the voltage at said battery terminals as the charge of the battery increases between discharge and a predetermined partial charge, a second regulator having a first coil responsive to the voltage across said battery terminals, an opposing coil responsive to the voltage across said resistance during charge and a variable resistance in the circuit of said field winding controlled by said first coil and said opposing coil for controlling said generator to decrease the voltage at the battery terminals as the charge of the battery increases from said partial charge to full charge, and a third regulator having a current coil responsive to the voltage across said resistor, a voltage coil opposing said current coil and responsive to the voltage across said load terminals modified by the voltage across said resistor during discharge and a variable resistance in the circuit of said field winding controlled by said current and voltage coils for decreasing the voltage of said generator to zero and increasing said generator voltage in reverse polarity to maintain the voltage at said load terminals substantially constant.

6. In a stand-by control system for a load device having connections to a supply source, a pair of conductors having terminals for connection to the load and terminals for connection to the stand-by battery, a generator having a field winding and having its armature connected in series in one of said conductors, a voltage dropping resistor connected in series in one of said conductors, a first regulator having a coil responsive to the voltage at said battery terminals and a coil responsive to the voltage drop across said resistor and connected to aid said voltage coil during charging and a variable resistance in the circuit of said field winding controlled by said coils for controlling said generator to increase the voltage supplied to the battery as the charge of the battery increases from full discharge to a predetermined partial charge, a second regulator having a voltage coil responsive to the voltage at said battery terminals and a current coil responsive to the voltage drop across said resistor and connected to oppose its associated voltage coil during charging and a variable resistance in the circuit of said field winding controlled by said voltage coil and said current coil to control said generator to decrease the voltage supplied to the battery as the charge of the battery increases from said partial charge to full charge, and a third regulator having a voltage coil connected across said conductors to be responsive to the voltage at said load terminals modified by the voltage drop across said resistor, a current coil responsive to the voltage drop across said resistor and connected to oppose its associated voltage coil during discharge and a variable resistance in the circuit of said field winding controlled by said last mentioned voltage coil and current coil for decreasing the voltage of said generator to zero and increasing said generator voltage in the reverse polarity to maintain the voltage at said load terminals substantially constant.

BURR S. WEAVER.

REFERENCES CITED

The following references are of record in the file of this patent:

UNITED STATES PATENTS

| Number | Name | Date |
|---|---|---|
| 435,545 | Prescott, Jr. | Sept. 2, 1890 |
| 435,687 | Edison | Sept. 2, 1890 |
| 531,765 | Biddle | Jan. 1, 1895 |
| 763,168 | Entz | June 21, 1904 |
| 1,023,490 | Beck et al. | Apr. 16, 1912 |
| 1,366,629 | Arendt | Jan. 25, 1921 |

FOREIGN PATENTS

| Number | Country | Date |
|---|---|---|
| 157,865 | Great Britain | July 10, 1922 |